(12) United States Patent
Miwa

(10) Patent No.: US 9,578,181 B2
(45) Date of Patent: Feb. 21, 2017

(54) DIGITAL SECURITY NETWORK SYSTEM AND METHOD

(75) Inventor: Kazuo Miwa, Tokyo (JP)

(73) Assignee: TECHNOMIRAI CO., LTD., Tokyo (JP)

( * ) Notice: Subject to any disclaimer, the term of this patent is extended or adjusted under 35 U.S.C. 154(b) by 0 days.

(21) Appl. No.: 14/412,930

(22) PCT Filed: Jul. 5, 2012

(86) PCT No.: PCT/JP2012/067242
§ 371 (c)(1),
(2), (4) Date: Mar. 30, 2015

(87) PCT Pub. No.: WO2014/006733
PCT Pub. Date: Jan. 9, 2014

(65) Prior Publication Data
US 2015/0229773 A1 Aug. 13, 2015

(51) Int. Cl.
*H04M 11/04* (2006.01)
*G08B 25/08* (2006.01)
(Continued)

(52) U.S. Cl.
CPC ............ *H04M 11/04* (2013.01); *G08B 25/001* (2013.01); *G08B 25/006* (2013.01); *G08B 25/016* (2013.01);
(Continued)

(58) Field of Classification Search
CPC  H04L 12/1895; H04W 4/22; G08B 13/19645; G08B 13/19656; G08B 13/19658; G08B 13/19691; G08B 13/19697; G08B 25/006; G08B 25/016; G08B 27/001; A16B 2560/0242; A16B 5/002; A16B 5/0022; A16B 5/04; A16B 5/1112
(Continued)

(56) References Cited

U.S. PATENT DOCUMENTS 7,385,496 B2 * 6/2008 Ogino .............. G08B 13/19645
340/3.1
9,210,271 B2 * 12/2015 Czaja ..................... H04M 11/04
(Continued)

FOREIGN PATENT DOCUMENTS

CN 101620768 A 1/2010
CN 102184614 A 9/2011
(Continued)

OTHER PUBLICATIONS

International Search Report issued in Application No. PCT/JP2012/067242, mailed Aug. 21, 2012.
(Continued)

*Primary Examiner* — Binh Tieu
(74) *Attorney, Agent, or Firm* — Michael Best & Friedrich LLP

(57) ABSTRACT

A monitoring device 100 comprises a control unit 101 including a positional information acquisition section 101A that tracks an existing position of the communication terminal 120 and acquires positional information of the communication terminal 120 and a jurisdiction retaining section 101B that retains a jurisdictional district to receive an emergency telephone call where a building under security exists, an input/output unit 102 that detects an emergency situation based on a sensor output from the input/output device 110, and an alarm sending unit 103 that reports an e-mail transmission or an image via the telephone line 130. The control unit 101, when having detected an emergency situation, performs control to specify a communication terminal 120 that exists in the police jurisdictional district or fire jurisdictional district with reference to the jurisdiction retaining section 101B, and to report preferentially to the specified communication terminal 120. Accordingly, reporting preferentially to a mobile phone within a jurisdictional district where a building under security exists allows
(Continued)

promptly reporting when an emergency call is made from the mobile phone.

5 Claims, 5 Drawing Sheets

(51) Int. Cl.
　　*H04W 4/22*　　　(2009.01)
　　*H04W 64/00*　　　(2009.01)
　　*H04W 76/00*　　　(2009.01)
　　*G08B 25/00*　　　(2006.01)
　　*G08B 25/01*　　　(2006.01)
　　*H04W 4/02*　　　(2009.01)
　　*H04W 4/00*　　　(2009.01)
　　*G08B 21/04*　　　(2006.01)

(52) U.S. Cl.
　　CPC ............... *G08B 25/08* (2013.01); *H04W 4/22* (2013.01); *H04W 64/00* (2013.01); *H04W 76/007* (2013.01); *G08B 21/043* (2013.01); *G08B 21/0453* (2013.01); *H04W 4/008* (2013.01); *H04W 4/02* (2013.01); *H04W 4/023* (2013.01)

(58) Field of Classification Search
　　USPC ........ 379/37, 39, 40, 41, 42, 44, 45, 49, 48; 455/404.1, 404.2
　　See application file for complete search history.

(56) References Cited

U.S. PATENT DOCUMENTS

| | | | | |
|---|---|---|---|---|
| 2005/0085257 | A1* | 4/2005 | Laird ..................... | A61B 5/04 455/550.1 |
| 2010/0166154 | A1 | 7/2010 | Peters | |
| 2011/0207429 | A1* | 8/2011 | Maier .................... | H04W 64/00 455/404.2 |
| 2014/0194084 | A1* | 7/2014 | Noonan ................ | H04W 8/005 455/404.1 |
| 2014/0364081 | A1* | 12/2014 | Rauner ............... | H04L 12/1895 455/404.2 |
| 2015/0118988 | A1* | 4/2015 | Shaw ..................... | G08B 23/00 455/404.1 |
| 2015/0140952 | A1* | 5/2015 | Petite ..................... | H04W 4/12 455/404.1 |

FOREIGN PATENT DOCUMENTS

| | | |
|---|---|---|
| CN | 102279997 A | 12/2011 |
| JM | 2012-113446 A | 6/2012 |
| JP | 2001-036645 A | 2/2001 |
| JP | 2001-118174 A | 4/2001 |
| JP | 2002-197578 A | 7/2002 |
| JP | 2002-261982 A | 9/2002 |
| JP | 2003-152867 A | 5/2003 |
| JP | 2004-265191 A | 9/2004 |
| JP | 2011-113255 A | 6/2011 |
| JP | 2011-228919 A | 11/2011 |
| WO | WO-2005/027486 A2 | 3/2005 |

OTHER PUBLICATIONS

Extended Search Report issued in European Application No. 12880437.4, dated Jun. 15, 2015.

Office Action issued in Chinese Patent Application No. 201280074510.2, dated Dec. 1, 2015.

Article 94(3) EPC Communication issued in European Application No. 12880437.4, dated Mar. 31, 2016.

\* cited by examiner

DIGITAL SECURITY NETWORK SYSTEM AND METHOD

TECHNICAL FIELD

The present invention relates to a digital security network system and method.

BACKGROUND ART

Security systems to exercise vigilance against intrusion of suspicious persons in individual residences or premises or commercial facilities, financial institutions, corporate buildings, or the like have been commonly known. For example, when a suspicious person intrudes into a residence or on a premise or the like, a security system issues a warning or the like to the suspicious person to threaten him/her and reports the matter to its resident, staff, security company, and/or the like.

Patent Literature 1 describes a security system that makes an abnormality in a switching operation recoverable at a stage the abnormality in a switching operation by an operator has been detected. In the security system described in Patent Literature 1, a control device that detects and reports an abnormality in a monitoring area stores identification information assigned to users and identification information assigned to an administrator associated with e-mail addresses respectively, accepts a switching operation for the setting of a security mode, and creates and transmits an e-mail message including a specified e-mail address according to these judgment results.

Patent Literature 2 describes an area security system that exercises vigilance in a specific area including housing lots for sale. The security system described in Patent Literature 2 determines the existing position and behavior pattern of a stranger, and displays stranger information in a display format according to the behavior pattern of the stranger at a point on map information corresponding to the existing position of the stranger.

On the other hand, portable telephones are currently commonplace, and some can even perform, in addition to basic voice calls, e-mail communications and image acquisition by an electronic camera and communications of the images, and can further acquire positional information using a positioning system (GPS: Global Positioning System) to display a current position on a map. Because portable telephones are by their nature carried and used whenever leaving home as information tools on a personal basis, individual location retrieval services and emergency report services in emergencies using portable telephones have been commercially available and used little by little. Moreover, there have been various proposals for emergency reports using portable telephones (for example, Patent Literatures 3 to 5).

That is, Patent Literature 3 describes an abnormality reporting system capable of simply reporting an abnormality when the abnormality has occurred. Moreover, Patent Literature 4 describes equipment that reports, with no effort, emergency information including map information to a variety of client terminals registered at the time of a service contract. Moreover, Patent Literature 5 describes a technique for promptly reporting positional information and the like of a reporter at the time of an abnormality. According to the system described in Patent Literature 5, a reporter carries a small-sized transmission device with him/her, and a portable telephone, upon having received a trigger signal from the small-sized device, receives a GPS signal to calculate positional information of the portable telephone, and transmits the same to an administrative server together with information such as its telephone number over a mobile telephone network. The administrative server transmits the information to terminals by push-based delivery.

CITATION LIST

Patent Literature

[Patent Literature 1] JP 2012-113446 A
[Patent Literature 2] JP 2011-113255 A
[Patent Literature 3] JP 2001-118174 A
[Patent Literature 4] JP 2002-197578 A
[Patent Literature 5] JP 2002-261982 A

SUMMARY OF INVENTION

Technical Problem

However, in such conventional security systems, if a person makes an emergency call (for example, the emergency number 110 or 119) from a mobile phone not within the jurisdictional district, a telephone receiving station once receives the call and contacts a station with jurisdiction, and the station with jurisdiction calls back the person. For example, in the case such that a person calls from Kagoshima while his/her home or office that requires security is located in Tokyo, a telephone receiving station once receives the call and contacts a station with jurisdiction, and the station with jurisdiction calls back the person. Therefore, there has been a problem of a delay in reporting.

An object of the present invention is to provide a digital security network system and method that allows promptly reporting when an emergency call is made from a mobile phone by reporting preferentially to a mobile phone within a jurisdictional district where a building under security exists.

Solution to Problem

A digital security network system according to the present invention includes a positional information acquiring means that detects existing positions of a plurality of communication terminals, and acquires positional information of the communication terminals, a jurisdiction retaining means that retains a jurisdictional district to receive an emergency reporting telephone call where a building under security exists, an emergency situation detecting means that detects an emergency situation, and a control means that refers to the jurisdiction retaining means in response to the emergency situation detecting means having detected an emergency situation, and if any of the plurality of communication terminals exists in the jurisdictional district, reports preferentially to the communication terminal existing in the jurisdictional district.

A digital security network method according to the present invention includes a step of detecting existing positions of a plurality of communication terminals, and acquiring positional information of the communication terminals, a step of retaining a jurisdictional district to receive an emergency reporting telephone call where a building under security exists, a step of detecting an emergency situation, and a step of, in response to having detected an emergency situation, if any of the plurality of communication terminals exists in the jurisdictional district, reporting preferentially to the communication terminal existing in the jurisdictional district.

Advantageous Effects of Invention

The present invention allows promptly reporting when an emergency call is made from a mobile phone by reporting preferentially to a mobile phone within a jurisdictional district where a building under security exists.

DESCRIPTION OF EMBODIMENTS

Hereinafter, modes for carrying out the present invention will be described in detail with reference to the accompanying drawings.

Embodiment

Figure 1:
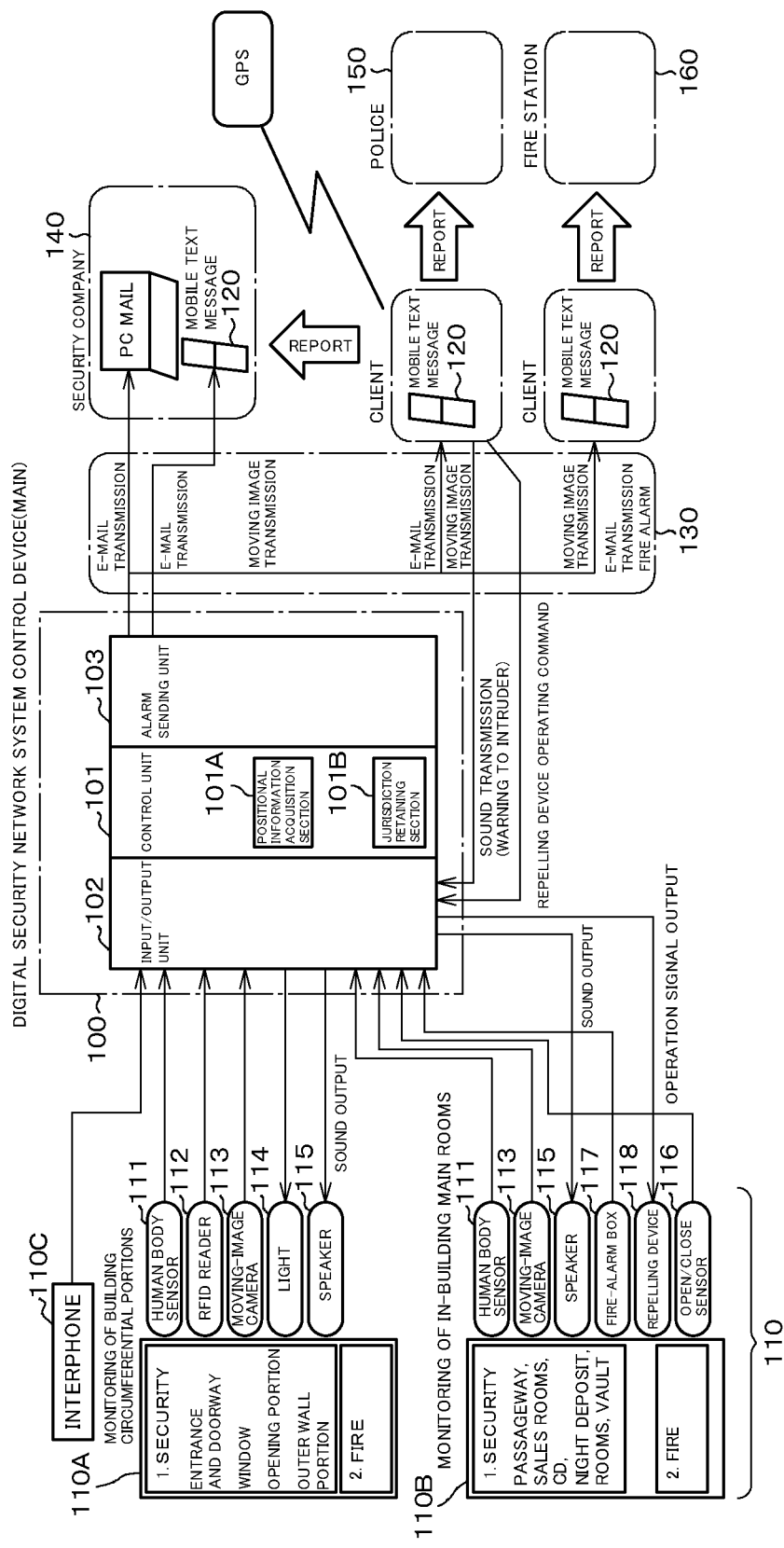
FIG. 1 is a block diagram showing a configuration of a digital security network system according to an embodiment of the present invention.

FIG. 1 is a block diagram showing a configuration of a digital security network system according to an embodiment of the present invention.

The present digital security network system is configured including a monitoring device 100 being a main body of digital security network system equipment, various types of input/output devices 110 that are installed at various points inside and outside of a building and connected to the monitoring device 100 by wires such as cables or by radio such as near-field radio to detect an abnormal state and inform an abnormality, and a plurality of communication terminals 120 capable of communications via a telephone line 130 being a public line.

In addition, when the digital security network system provides services of a security contract to the communication terminals 120, users of the communication terminals 120 can be referred to as clients from the viewpoint of the digital security network system.

[Monitoring Device 100]

The monitoring device 100 comprises a control unit 101, an input/output unit 102, and an alarm sending unit 103.

The control unit 101 is formed by a microcomputer or the like, and controls the device as a whole and executes a security program to function as a digital security network system. The control unit 101 has a memory (not shown) to store information. A semiconductor memory, a magnetic recording device, an optical disk device, a magneto-optical disk drive device, or the like can be the memory.

The control unit 101 comprises a positional information acquisition section 101A that tracks an existing position of the communication terminal 120 and acquires positional information of the communication terminal 120, and a jurisdiction retaining section 101B that respectively retains a police jurisdictional district and a fire jurisdictional district as receiving jurisdictional districts of mobile phones. Here, the police jurisdictional districts and fire jurisdictional districts as receiving jurisdictional districts of mobile phones are not always the same, for example, the police jurisdictional districts in Japan are on a prefecture-by-prefecture basis, and the fire jurisdictional districts are smaller than the police jurisdictional districts. Therefore, it is not necessary to retain both of the police jurisdictional districts and fire jurisdictional districts if both are equal in the country. The control unit 101, when having detected an emergency situation, performs control to specify a communication terminal 120 that exists in the police jurisdictional district or fire jurisdictional district, according to the content of the emergency situation, with reference to the jurisdiction retaining section 101B, and to report preferentially to the specified communication terminal 120.

The control unit 101 judges a sound transmission (warning to intruder) and a repelling device operating command transmitted from the communication terminal 120 having received a report, and if these commands are as such, outputs a sound output to a speaker 115 via the input/output unit 102, and outputs an operation signal to the repelling device 118.

The input/output unit 102 has a function as an emergency situation detecting means that detects an emergency situation based on a sensor output from the input/output device 110. The input/output unit 102 receives positional information of the respective communication terminals 120 transmitted from the communication terminal 120 via the telephone line 130, and outputs these signals to the control unit 101. The input/output unit 102 receives a sound transmission (warning to intruder) and repelling device operating command transmitted from the communication terminal 120 via the telephone line 130, and outputs these signals to the control unit 101.

The alarm sending unit 103 transmits an e-mail, an image including a moving image, or a fire alarm to the communication terminal 120 and the security company 140 via the telephone line 130.

[Input/Output Device 110]

The input/output device 110 comprises monitoring of building circumferential portions 110A, monitoring of in-building main rooms 110B consisting of various sensors and output devices, and an interphone 110C.

The monitoring of building circumferential portions 110A is mainly for the purpose of security for entrances, windows, opening portions, and outer wall portions and fire safety. Examples of the input devices of the monitoring of building circumferential portions 110A are a human body sensor 111, an RFID (Radio Frequency Identification) reader 112, and a moving-image camera 113, and examples of its output devices are a light 114 and a speaker 115. The RFID is an authentication technology using radio waves. The RFID reader 112 reads information on an IC chip by an RW (reader/writer) device to perform object recognition or personal authentication. The moving-image camera 113 takes a moving image. The light 114 lights up or blinks to warn a suspicious person or the like. The speaker 115 releases a message or a warning tone based on a sound output signal from the input/output unit 102 to warn the suspicious person or the like.

The monitoring of in-building main rooms 110B is mainly for the purpose of security for passageways, salesrooms, cash dispensers (CDs), a night deposit, rooms, and a vault and fire safety. Examples of the input devices of the monitoring of building circumferential portions 110A are a human body sensor 111, a moving-image camera 113, an open/close sensor 116, and a fire-alarm box 117, and examples of its output devices are a speaker 115 and a repelling device 118. The open/close sensor 116 is a contact sensor or the like that senses opening and closing of a door. The repelling device 118 is, for example, a sound amplification device and/or spray device installed in a vault or main room. The repelling device 118 is activated based on an operation signal output from the input/output portion 102, and releases a loud sound as an amplified sound or the like to repel a suspicious person. Alternatively, the repelling device 118 may be a warning device, such as a sensor light, that appeals to the human senses.

The interphone 110C is installed at the entrance, and inputs a sound signal such as a visitor's inquiry to the input/output portion 102 of the monitoring device 100. Moreover, a remote control function of the monitoring device 100 enables outputting a sound signal from the communication terminal 120 to the interphone 110C.

[Communication Terminal 120]

The communication terminals 120 consist of mobile phones, PHS (Personal Handy-Phone System) phones, PDAs (Personal Digital Assistants), smartphones, or the like, and transmit a sound transmission and a repelling device operating command to the monitoring device 100 via the telephone line 130. In the present embodiment, the communication terminals 120 assume the use of mobile phones or smartphones, and each individual can use the same at a variety of locations (that is, existing positions). One of the communication terminals 120 is disposed at the security company 140 together with a PC (Personal Computer). The communication terminal 120 is capable of receiving an e-mail message, an image including a moving image, or the like from the monitoring device 100 via the telephone line 130.

The communication terminal 120 includes a GPS function unit 121 (refer to FIG. 3) that receives radio waves of positional information from a GPS satellite or the like, and calculates, from information received via a GPS antenna, current position information as two parameters of the latitude and longitude to acquire positional information. In general, altitude information can also be acquired by the GPS, but is not used in the present embodiment. Moreover, current position information of the communication terminal 120 can also be acquired by performing transmission/reception of information with a mobile phone company server via a base station and network used in place of the GPS function unit 121 or in combination therewith. The acquired positional information is transmitted on a timely basis to the monitoring device 100.

The security company 140, when having received an e-mail message, an image, or the like from the present digital security network system, performs investigation on the abnormal situation. In addition, the security company 140 is not an essential structural element of the digital security network system according to the present embodiment.

Hereinafter, security operations of the digital security network system configured as described above will be described.

First, an outdoor security function of the digital security network system will be described taking a security operation for example.

Figure 2:
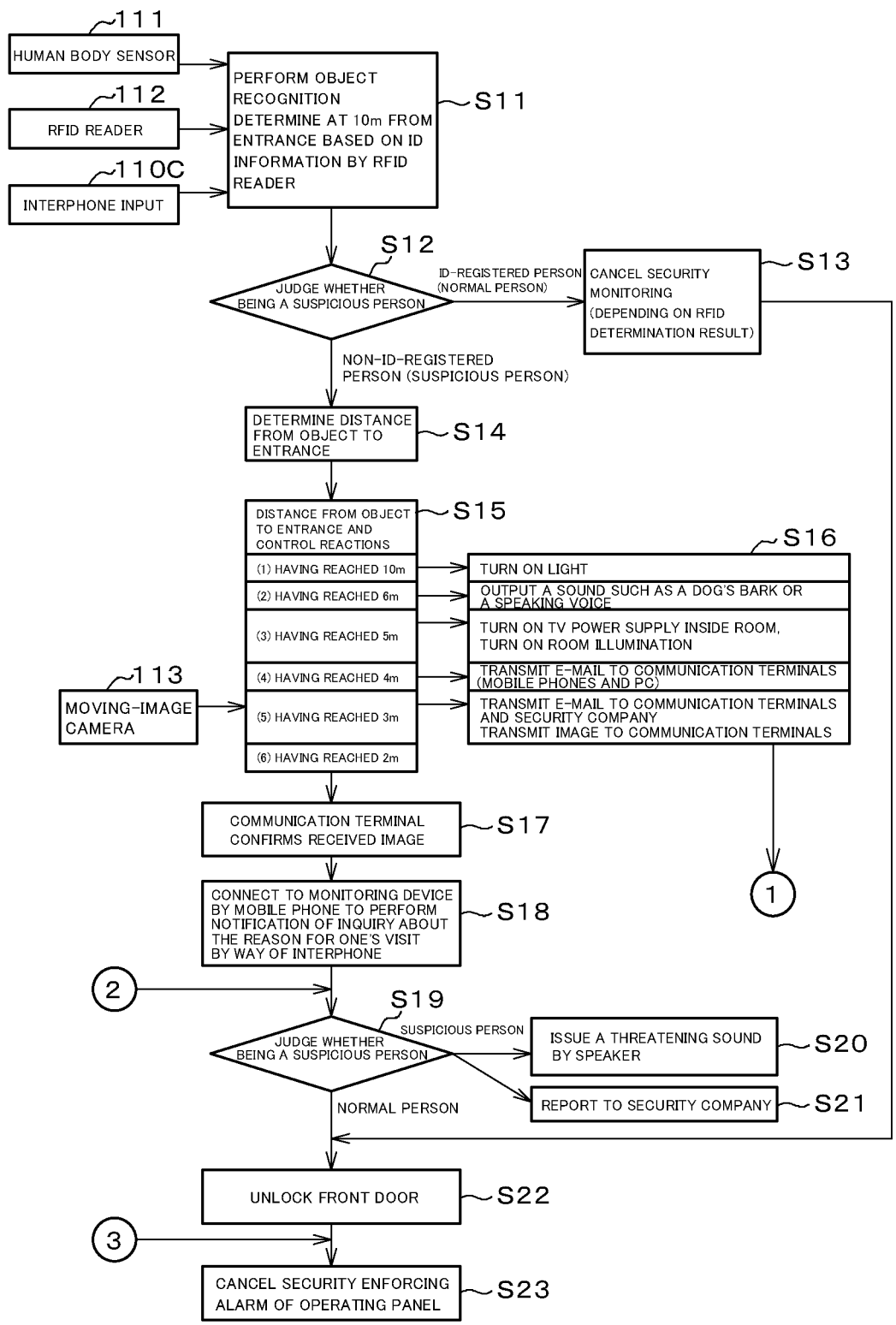
FIG. 2 is a flowchart showing the procedure and operation of an outdoor security function of the digital security network system according to the above-mentioned embodiment.
Figure 3:
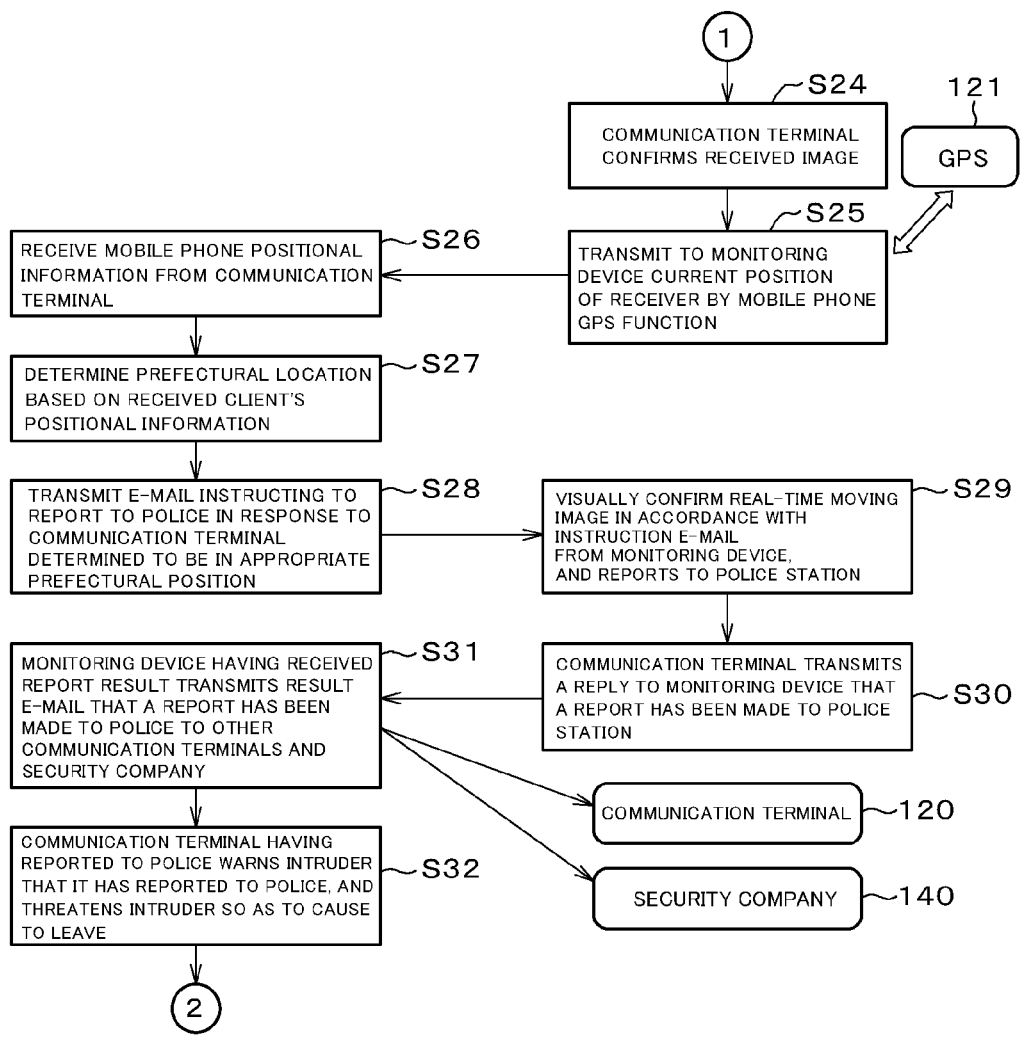
FIG. 3 is a flowchart showing the procedure and operation of an outdoor security function of the digital security network system according to the above-mentioned embodiment.

FIG. 2 and FIG. 3 are flowcharts showing the procedure and operation of an outdoor security function of the digital security network system. The present flow is executed mainly by the control unit 101 of the monitoring device 100. Moreover, the present flow is executed by a control unit (not shown) of the communication terminal 120 having received a transmission from the monitoring device 100. In the figures, S denotes respective steps of the flow to be executed by the control unit 101 of the monitoring device 100 and the control unit of the communication terminal 120.

First, in step S11, the control unit 101 performs object recognition by respective sensor inputs. Specifically, the input/output unit 102 of the monitoring device 100 accepts inputs of the human body sensor 111, the RFID reader 112, and the interphone 110C installed at an entrance/doorway, a window, an opening portion, an outer wall portion, or the like as security (refer to FIG. 1) functions of the monitoring of building circumferential portions 110A. The control unit 101 recognizes that an object (a person or the like) has entered a jurisdictional outdoor area based on these sensor inputs. Here, the control unit 101, based on ID information of the RFID reader 112, performs an object determination when the object has reached, for example, 10 m from the entrance.

In step S12, the control unit 101 judges whether the recognized object is a suspicious person based on an RFID determination result. For example, the control unit 101, if the RFID ID information is of a person whose ID has been registered, judges that the object is a normal person to proceed to step S13, and if the ID information is of a person whose ID has not been registered, judges that the object is possibly a suspicious person to proceed to step S14.

In step S13, the control unit 101 cancels security monitoring according to the RFID determination result to proceed to step S22.

In the case of being a person whose ID has not been registered in step S12 mentioned above, the control unit 101 determines the distance from the object to the entrance in step S14.

In step S15, the control unit 101 performs control reactions according to the distance from the object to the entrance. That is, (1) when the distance from the object to the entrance has reached 10 m, the control unit 101 outputs a control signal to the light 114 (refer to FIG. 1) to light up the light 114 in step S16. (2) When the distance from the object to the entrance has reached 6 m, the control unit 101 outputs a sound signal to the speaker 115 (refer to FIG. 1) to output a sound such as a dog's bark or a speaking voice from the speaker 115 in step S16. (3) When the distance from the object to the entrance has reached 5 m, the control unit 101 turns on a TV power supply inside of a room or lights up room lighting. By control reactions so far, the present digital security network system informs the suspicious person that his/her intrusion has been recognized.

(4) When the distance from the object to the entrance has reached 4 m, the control unit 101 transmits an e-mail message to the respective communication terminals 120 and the PC of the security company 140 in step S16. In particular, the respective communication terminals 120 are formed by mobile phones, smartphones, or the like that are capable of mobile communications, and are used at the locations (that is, existing positions) of each individual. Moreover, the existing positions of these communication terminals 120 may have been tracked in advance by the monitoring device 100, and the monitoring device 100 may have stored the existing positions of these communication terminals 120. When the distance from the object to the entrance has reached 4 m, the control unit 101 thus transmits an e-mail message to each communication terminal 120 and the PC of the security company 140.

(5) To the input/output unit 102 (refer to FIG. 1) of the monitoring device 100, an image from the moving-image camera 113 is being input. When the distance from the object to the entrance has reached 3 m, the control unit 101 takes in the image from the moving-image camera 113 in step S15. In addition, there may be a mode in which the moving-image camera 113 is started when the distance from the object to the entrance has reached 3 m. When the distance from the object to the entrance has reached 3 m, the control unit 101 transmits the taken image to the respective communication terminals 120 and the PC of the security company 140 in step S16. When the distance from the object to the entrance has reached 3 m, the control unit 101 thus transmits an image to the respective communication terminals 120 and the PC of the security company 140 in addition to an e-mail message. A detailed operation using positional information of the communication terminal 120 to receive an image transmitted from the monitoring device 100 will be described in step S24 onward of FIG. 3.

(6) When the distance from the object to the entrance has reached 2 m, the control unit 101 shifts to a final judgment process of the suspicious person through step S15. In addition, by detecting a signal of a laser or radar installed at the building, the distance from the object to the entrance can be more accurately detected.

In step S17, the user of each communication terminal 120 confirms the image received from the monitoring device 100.

In step S18, the user of each communication terminal 120, after confirmation of the image, connects to the monitoring device 100 by using the communication terminal 120 to perform notification such as an inquiry about the reason for one's visit by way of the interphone 110C by the remote control function of the monitoring device 100, if having judged that this is necessary.

In step S19, the control unit 101 judges whether it is a suspicious person based on the confirmation by the interphone 110C or an e-mail confirmation to be described later. In the case of being a suspicious person, the input/output unit 102 issues a threatening sound by the speaker 115 in step S20, and the alarm sending unit 103 reports to the security company 140 in step S21.

On the other hand, in the case of not being a suspicious person in step S19 mentioned above, the control unit 101 unlocks the front door in step S22, and cancels a security enforcing alarm of an operating panel in step S23 to end the present flow.

When an image is transmitted from the monitoring device 100 in step S16 mentioned above, the control unit 101 proceeds to step S24 of FIG. 3.

In step S24, the user of each communication terminal 120 confirms the received image.

In step S25, the control unit of the communication terminal 120 transmits current positional information detected by the GPS function unit 121 to the monitoring device 100.

In step S26, for the control unit 101 of the monitoring device 100, the input/output unit 102 receives the positional information from the communication terminal 120.

In step S27, the control unit 101, based on the received positional information of the communication terminal 120, determines in which of the prefectures being emergency police telephone call receiving jurisdictional districts said communication terminal 120 is located.

In step S28, the control unit 101 transmits an e-mail message instructing to report to a police 150 preferentially to a communication terminal 120 determined to be existing in an appropriate prefecture being a jurisdictional district where the building under security exists.

In step S29, the control unit of the communication terminal 120 receives the report instruction e-mail message from the monitoring device 100. The user of the communication terminal 120 visually confirms a real-time moving image in accordance with the received report instruction e-mail message, and reports to the police 150 according to necessity.

In step S30, the control unit of the communication terminal 120 transmits to the monitoring device 100 a reply that a report has been made to the police 150 or that notification has not been made to the police 150.

In step S31, the control unit 101 of the monitoring device 100 transmits a result e-mail message that a report has been made to the police 150 to other communication terminals 120 and the security company 140.

In step S32, the user of the communication terminal 120 who has reported to the police 150 warns the intruder that he/she has reported to the police 150, and threatens the intruder with this warning so as to cause the intruder to leave. Thereafter, the control unit 101 proceeds to step S19 mentioned above.

Next, an indoor security function of the digital security network system will be described taking a security operation for example.

Figure 4:
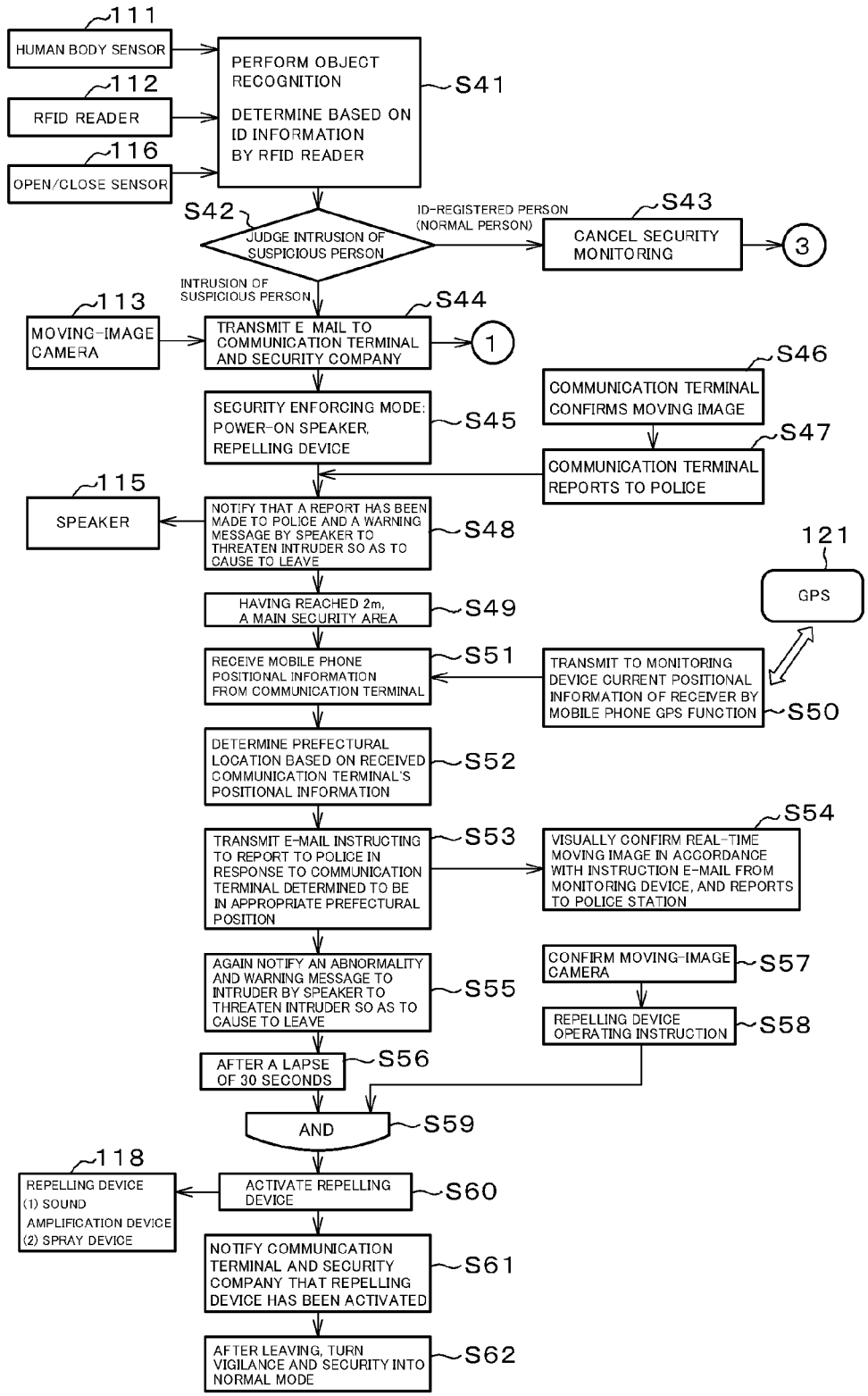
FIG. 4 is a flowchart showing the procedure and operation of an indoor security function of the digital security network system according to the above-mentioned embodiment.

FIG. 4 is a flowchart showing the procedure and operation of an indoor security function of the digital security network system. The present flow is an example of application to a repelling flow against intrusion by suspicious persons.

First, in step S41, the control unit 101 performs object recognition by respective sensor inputs. Specifically, the input/output unit 102 of the monitoring device 100 accepts inputs of the human body sensor 111, the RFID reader 112, and the open/close sensor 116 installed at a passageway, a sales rooms, a cash dispenser, a night deposit, each room, a vault, or the like as security (refer to FIG. 1) functions in the monitoring of in-building main rooms 110B. The control unit 101 recognizes that an object (a person or the like) has entered an indoor area based on these sensor inputs. Here, the control unit 101 performs a determination based on ID information of the RFID reader 112.

In step S42, the control unit 101 judges whether the recognized object is a suspicious person based on an RFID determination result. The control unit 101, if the RFID ID information is of a person whose ID has been registered, judges that the object is a normal person to proceed to step S43, and if the ID information is of a person whose ID has not been registered, judges that the object is possibly a suspicious person to proceed to step S44.

In step S43, the control unit 101 cancels security monitoring to proceed to step S23 (refer to FIG. 3).

In the case of being a person whose ID has not been registered in step S42 mentioned above, the control unit 101 judges that a suspicious person has intruded to take in an image from the moving-image camera 113, and transmits an e-mail message and the image to an appropriate communication terminal 120 and the security company 140 to proceed to step S45. Moreover, the communication terminal 120 to which an e-mail message and image have been transmitted from the monitoring device 100 executes step S24 of FIG. 3. That is, in step S24 (refer to FIG. 3), the user of the communication terminal 120 confirms the received image.

In step S45, the control unit 101 executes a security enforcing mode. The security enforcing mode is specifically a sound output to the speaker 115 and power-on of the repelling device.

On the other hand, in step S46, the user of the communication terminal 120 confirms the received image, and if having judged that a report is necessary, reports to the police 150 in step S47.

In step S48, the control unit 101 notifies the intruder that a report has been made to the police 150 and a warning message by the speaker 115 to threaten the intruder so as to cause the intruder to leave.

In step S49, the control unit 101 detects by the human body sensor 111 or the like that the intruder has reached 2 m being a main security area.

In step S50, the control unit of the communication terminal 120 transmits current positional information detected by the GPS function unit 121 to the monitoring device 100.

In step S51, for the control unit 101 of the monitoring device 100, the input/output unit 102 receives the positional information from the communication terminal 120.

In step S52, the control unit 101, based on the received positional information of the communication terminal 120, determines in which of the prefectures being emergency police telephone call receiving jurisdictional districts said communication terminal 120 is located.

In step S53, the control unit 101 transmits an e-mail message instructing to report to a police 150 preferentially to a communication terminal 120 determined to be located in an appropriate prefecture being a jurisdictional district where the building under security exists.

In step S54, the control unit of the communication terminal 120 receives the report instruction e-mail message from the monitoring device 100. The user of the communication terminal 120 visually confirms a real-time moving image in accordance with the received report instruction e-mail message, and reports to the police 150 according to necessity.

In step S55, the control unit 101 again notifies the occurrence of an abnormality and a warning message to the intruder by the speaker 115 to threaten the intruder so as to cause the intruder to leave.

In step S56, the control unit 101 measures a predetermined time (for example, 30 minutes) has elapsed.

On the other hand, in step S57, the user of the communication terminal 120 confirms a received moving image. In step S58, the user of the communication terminal 120 issues a repelling device operating instruction according to necessity. Specifically, the user of the communication terminal 120 executes a repelling device operating instruction by performing a button operation in accordance with a previously prepared menu. The control unit of the communication terminal 120 transmits this repelling device operating command (refer to FIG. 1) to the monitoring device 100 via the telephone line 130. The input/output unit 102 of the monitoring device 100 outputs the received repelling device operating command to the control unit 101.

In step S59, the control unit 101 determines that 30 seconds has elapsed from the re-notification of a warning message in step S55 mentioned above and a repelling device operating command has been received from the communication terminal 120. In the case of the above-mentioned elapse of 30 seconds and the above-mentioned reception of a repelling device operating command, the control unit 101 activates the repelling device 118 in step S60. The repelling device 118 is, for example, a sound amplification device and/or spray device. The control unit 101, by activating the repelling device 118, threatens and repels the suspicious person.

In step S61, the control unit 101 notifies an appropriate communication terminal 120 and the security company 140 that the repelling device 118 has been activated.

In step S62, the control unit 101 confirms leaving of the intruder by the same method as that for the above-mentioned determination of intrusion of a suspicious person, and if the intruder has left, turns the vigilance and security into a normal mode to end the present flow.

Next, a fire safety function of the digital security network system will be described.

Figure 5:
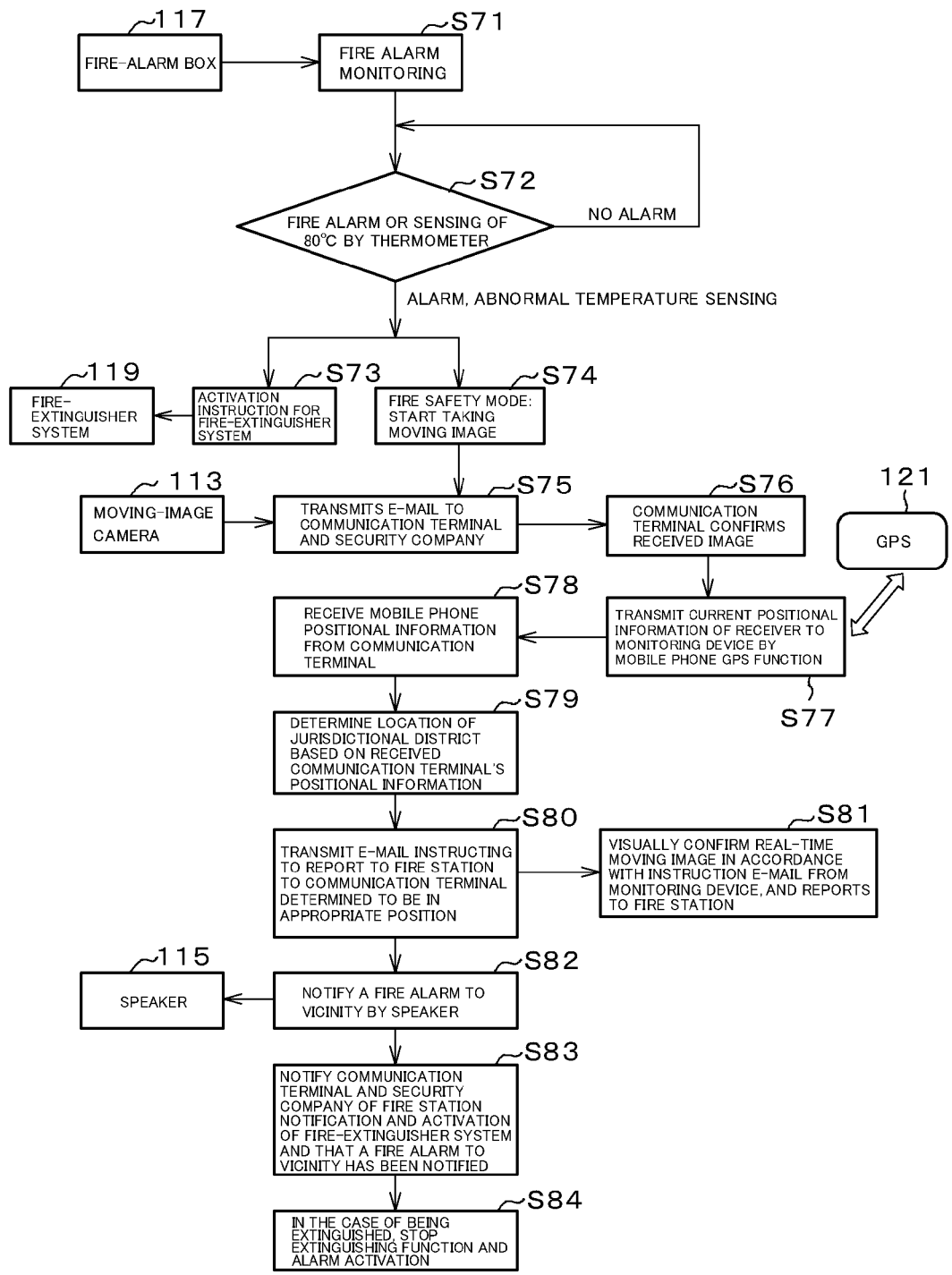
FIG. 5 is a flowchart showing the procedure and operation of a fire safety function of the digital security network system according to the above-mentioned embodiment.

FIG. 5 is a flowchart showing the procedure and operation of a fire safety function of the digital security network system.

First, in step S71, the monitoring device 100 performs fire alarm monitoring. Specifically, the input/output unit 102 of the monitoring device 100 monitors an alarm from the fire-alarm box 117 at all times.

In step S72, the control unit 101 determines, by the input/output unit 102, an alarm from the fire-alarm box 117 or whether a thermometer installed in each room or the like has sensed an abnormality (for example, 80° C.)

In the case of the above-mentioned sensing of an alarm or abnormal temperature, the control unit 101 outputs an activation instruction for a fire-extinguisher system 119 in step S75. The fire-extinguisher system 119 is activated in accordance with an activation instruction. Moreover, the control unit 101 shifts to a fire safety mode in step S74 to start taking a moving image.

In step S75, the control unit 101 takes in an image from the moving-image camera 113, and transmits an e-mail message and the image to an appropriate communication terminal 120 and the security company 140 to proceed to step S76.

In step S76, the user of the communication terminal 120 to which an e-mail message and image have been transmitted from the monitoring device 100 confirms the received image.

In step S77, the control unit of the communication terminal 120 transmits current positional information detected by the GPS function unit 121 to the monitoring device 100.

In step S78, for the control unit 101 of the monitoring device 100, the input/output unit 102 receives the positional information from the communication terminal 120.

In step S79, the control unit 101, based on the received positional information of the communication terminal 120, determines in which of the emergency fire telephone call receiving jurisdictional districts said communication terminal 120 is located.

In step S80, the control unit 101 transmits an e-mail message instructing to report to a fire station 160 to a communication terminal 120 determined to be located in a jurisdictional district where the building under security exists.

In step S81, the control unit of the communication terminal 120 receives the report instruction e-mail message from the monitoring device 100. The user of the communication terminal 120 visually confirms a real-time moving image in accordance with the received report instruction e-mail message, and reports to the fire station 160.

In step S82, the control unit 101 notifies a fire alarm to the vicinity by the speaker 115.

In step S83, the control unit 101 notifies an appropriate communication terminal 120 and the security company 140 of a report to the fire station 160, activation of the fire-extinguisher system 119 and that a fire alarm to the vicinity has been notified.

In step S84, the control unit 101 confirms it has been extinguished by the same method as that for the above-mentioned determination of an alarm or abnormal temperature, and in the case of being extinguished, stops the extinguishing function and alarm activation to end the present flow.

As described in detail above, according to the present embodiment, the monitoring device 100 comprises a control unit 101 including a positional information acquisition section 101A that tracks existing positions of communication terminals 120 and acquires positional information of the communication terminals 120 and a jurisdiction retaining section 101B that retains a police jurisdiction and fire jurisdictional district to receive an emergency telephone call where a building under security exists, an input/output unit 102 that detects an emergency situation based on a sensor output from an input/output device 110, and an alarm sending unit 103 that reports an e-mail transmission or an image via a telephone line 130. The control unit 101, when having detected an emergency situation, performs control to specify a communication terminal 120 that exists in the police jurisdictional district or fire jurisdictional district with reference to the jurisdiction retaining section 101B, and to report preferentially to the specified communication terminal 120.

By this configuration, tracking existing positions of a plurality of mobile phones (communication terminals 120) allows, when an emergency situation is detected, reporting preferentially to a mobile phone existing in the police or fire jurisdictional district. This report is, for example, an e-mail transmission and/or image. A person who possesses the mobile phone that has received the report can check the received e-mail or image and call the police or fire station from within the jurisdictional district. The conventional example has a problem in a time-sensitive situation, such that if a person makes an emergency call (for example, the emergency number 110 or 119) from a mobile phone not within the jurisdictional district (the case such that a person calls from Kagoshima while his/her home that requires security is located in Tokyo), a telephone receiving station once receives the call and contacts a station with jurisdiction, and the station with jurisdiction calls back the person, which thus results in a delay in reporting. In the present embodiment, a report from the monitoring device 100 is received in, for example, a police jurisdictional district, and a person who possesses the mobile phone that has received the report reports to the police within the jurisdictional district, which thus allows promptly reporting.

In particular, the police jurisdictional districts are set prefecture by prefecture, and the fire jurisdictional districts are smaller than the police jurisdictional districts. That is, the police and fire fighting are different in jurisdictional district including the size. In the present embodiment, the jurisdictional district can be differentiated depending on whether the matter is intrusion or approach of a suspicious person(s) or fire.

Moreover, because an error in position detection can possibly occur near a boundary of jurisdictional districts, if there is a communication terminal that exists inside separated at a predetermined distance or more from a boundary of the jurisdictional district, reporting further preferentially to said communication terminal allows promptly performing an emergency report more reliably from the mobile phone within the jurisdictional district.

Moreover, the digital security network system of the present embodiment allows using a general-purpose communication terminal such as a mobile phone as terminal equipment of a digital security network system via a telephone line 130 being an existing public line, so that terminal equipment dedicated for the digital security network system is no longer necessary, and the costs to introduce the digital security network system can be held low.

Moreover, the digital security network system of the present embodiment allows confirming a report also by use of a public line, so that the safety of the digital security network system can be enhanced.

The above description is an exemplification of preferred embodiments of the present invention, and the scope of the present invention is not limited thereto. For example, in the present embodiment, a description has been given of the case of using the telephone line 120 as a public line, but the present invention is not limited to this case, and for example, a radio communication line, the Internet, or a LAN may be used as a public line. Moreover, the communication terminal may be used according to the type of the public line, such as a transceiver used as a communication terminal when the public line is radio communication, and a personal computer or a palmtop computer used as a communication terminal when the public line is the Internet or a LAN. Thus constructing a digital security network system using an existing public line allows expanding the usage form of a digital security network system and allows suppressing the construction costs of a digital security network system.

Moreover, the title of a digital security network system and method has been used in the present embodiment, but this is for convenience of description, and the title may be a security system, a crime-prevention system, a security method, or the like.

Further, detection of an emergency situation covers all of publicly-known matters. Examples of the emergency situation include intrusion or approach of a suspicious person (s) and fire. In addition, the approach distance is also reported in the present embodiment. Also, the report may be any without being limited to an e-mail message.

Also, a digital security network system and method of the present invention can also be realized by a program to operate a computer as the present digital security network system or method. This program may be stored in a storage medium that can be read by a computer.

This storage medium recorded with the program may be a ROM itself of the present digital security network system, or may be a storage medium such as a CD-ROM that can be read, when a program reading device such as a CD-ROM drive is provided as an external storage device, by inserting therein the storage medium.

Moreover, the above-described storage medium may be a magnetic tape, a cassette tape, a flexible disk, a hard disk, an MO/MD/DVD or the like, or a semiconductor memory.

All publications, patents and patent applications cited in the present specification are hereby incorporated by reference in their entirety.

INDUSTRIAL APPLICABILITY

The digital security network system and method according to the present invention responds in real time to home security network systems and corporate and commercial facilities, offices, and the like to prevent losses of property and life and economic losses, whereby providing great utilization effects.

REFERENCE SIGNS LIST 100 monitoring device
101 control unit
101A positional information acquisition section
101B jurisdiction retaining section
102 input/output unit
103 alarm sending unit
110 input/output device
110C interphone
111 human body sensor
112 RFID reader
113 moving-image camera
114 light
115 speaker
116 open/close sensor
117 fire-alarm box
118 repelling device
119 fire-extinguisher system
120 communication terminal
121 GPS function unit
130 telephone line
140 security company

The invention claimed is:

1. A digital security network system comprising:
positional information acquiring means for detecting existing positions of a plurality of communication terminals, and acquiring positional information of the communication terminals;
jurisdiction retaining means for retaining a jurisdictional district for receiving an emergency telephone call where a building under security exists;
emergency situation detecting means for detecting an emergency situation by one of a plurality of sensors; and
control means for referring to the jurisdiction retaining means in response to the emergency situation detecting means having detected an emergency situation, and if any of the plurality of communication terminals exists in the jurisdictional district, transmitting preferentially to the communication terminal existing in the jurisdictional district a message instructing to make the emergency telephone call and receiving a reply that the emergency telephone call has been made.

2. The digital security network system according to claim 1, wherein the control means transmits an e-mail and an image.

3. The digital security network system according to claim 1, wherein the jurisdiction retaining means retains both of a police jurisdictional district and a fire jurisdictional district, and the control means refers to the police jurisdictional district when the emergency situation is a matter regarding police and refers to the fire jurisdictional district when the emergency situation is a matter regarding fire fighting.

4. The digital security network system according to claim 1, wherein the control means further reports, if any of the communication terminals exists inside and a predetermined distance or more away from a boundary of the jurisdictional district, preferentially to the communication terminal.

5. A digital security network method comprising:
a step of detecting existing positions of a plurality of communication terminals, and acquiring positional information of the communication terminals;
a step of retaining a jurisdictional district for receiving an emergency telephone call where a building under security exists;
a step of detecting an emergency situation by one of a plurality of sensors; and
a step of, in response to having detected an emergency situation, if any of the plurality of communication terminals exists in the jurisdictional district, transmitting preferentially to the communication terminal existing in the jurisdictional district a message instructing to make the emergency telephone call and receiving a reply that the emergency telephone call has been made.

* * * * *